(12) United States Patent
Benhase et al.

(10) Patent No.: US 8,327,095 B2
(45) Date of Patent: Dec. 4, 2012

(54) MAINTAINING INFORMATION OF A RELATIONSHIP OF TARGET VOLUMES COMPRISING LOGICAL COPIES OF A SOURCE VOLUME

(75) Inventors: Michael Thomas Benhase, Tucson, AZ (US); Wendy Lynn Ward, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 875 days.

(21) Appl. No.: 12/135,083

(22) Filed: Jun. 6, 2008

(65) Prior Publication Data

US 2009/0307453 A1    Dec. 10, 2009

(51) Int. Cl.
| | |
|---|---|
| G06F 12/00 | (2006.01) |
| G06F 13/00 | (2006.01) |
| G06F 13/28 | (2006.01) |
| G06F 9/26 | (2006.01) |
| G06F 9/34 | (2006.01) |
| G06F 7/00 | (2006.01) |
| G06F 17/00 | (2006.01) |

(52) U.S. Cl. ........... 711/162; 711/202; 711/E12.001; 707/634; 707/639; 707/645; 707/646; 707/679

(58) Field of Classification Search .......... 711/162, 711/202, E12.001; 707/634, 639, 645, 646, 707/647, 649, 679
See application file for complete search history.

(56) References Cited

U.S. PATENT DOCUMENTS

| | | | |
|---|---|---|---|
| 5,881,379 | A | 3/1999 | Beier et al. |
| 6,611,901 | B1 * | 8/2003 | Micka et al. ............... 711/162 |
| 7,000,145 | B2 * | 2/2006 | Werner et al. .............. 714/20 |
| 7,073,038 | B2 | 7/2006 | Milligan et al. |
| 2005/0010731 | A1 | 1/2005 | Zalewski et al. |
| 2005/0052921 | A1 | 3/2005 | Butterworth et al. |
| 2006/0095695 | A1 * | 5/2006 | Daniels et al. .............. 711/162 |
| 2006/0123212 | A1 | 6/2006 | Yagawa |
| 2006/0143412 | A1 * | 6/2006 | Armangau ................. 711/162 |
| 2007/0028040 | A1 | 2/2007 | Sinclair |
| 2007/0245104 | A1 | 10/2007 | Lindemann et al. |
| 2008/0077629 | A1 | 3/2008 | Lorenz et al. |

OTHER PUBLICATIONS

PCT International Search Report and Written Opinion dated Aug. 28, 2009 for Serial No. PCT/EP2009/056614 filed May 29, 2009.

* cited by examiner

*Primary Examiner* — Michael Alsip
(74) *Attorney, Agent, or Firm* — David W. Victor; Konrad Raynes & Victor LLP (57) ABSTRACT

Provided are a method, system, and article of manufacture for maintaining information of a relationship of target volumes comprising logical copies of a source volume. Information is maintained on a source volume having a plurality of data units and a plurality of target volumes created at different points-in-time maintaining a logical copy of the data units in the source volume for the different points-in-time. A source downstream pointer is generated for each data unit in the source volume to point to a corresponding data unit in a first target volume. For each target volume data unit whose data is maintained in the source volume or another one of the target volumes, a first upstream pointer is generated indicating one of the source and target volumes from which the target volume data unit inherits data. For each target volume data unit whose data is maintained in the source volume or another one of the target volumes, generating a second upstream pointer indicating one of the source and target volumes having the data for the data unit.

27 Claims, 6 Drawing Sheets

MAINTAINING INFORMATION OF A RELATIONSHIP OF TARGET VOLUMES COMPRISING LOGICAL COPIES OF A SOURCE VOLUME

BACKGROUND OF THE INVENTION

1. Field of the Invention

The present invention relates to a method, system, and article of manufacture for maintaining information of a relationship of target volumes comprising logical copies of a source volume.

2. Description of the Related Art

Disaster recovery systems typically address two types of failures, a sudden catastrophic failure at a single point in time or data loss over a period of time. In the second type of gradual disaster, updates to volumes may be lost. To assist in recovery of data updates, a copy of data may be provided at a remote location. Such dual or shadow copies are typically made as the application system is writing new data to a primary storage device. Different copy technologies may be used for maintaining remote copies of data at a secondary site, such as International Business Machine Corporation's ("IBM") Extended Remote Copy (XRC), Coupled XRC (CXRC), Global Copy, and Global Mirror Copy.

In data mirroring systems, data is maintained in volume pairs. A volume pair is comprised of a volume in a primary storage device and a corresponding volume in a secondary storage device that includes an identical copy of the data maintained in the primary volume. Primary and secondary storage controllers may be used to control access to the primary and secondary storage devices. In certain data mirroring systems, a timer is used to provide a uniform time across systems so that updates written by different applications to different primary storage devices use consistent time-of-day (TOD) value as a time stamp. The host operating system or the application may time stamp updates to a data set or set of data sets when writing such data sets to volumes in the primary storage. The integrity of data updates is related to insuring that updates are done at the secondary volumes in the volume pair in the same order as they were done on the primary volume. The time stamp provided by the application program determines the logical sequence of data updates.

In many application programs, such as database systems, certain writes cannot occur unless a previous write occurred; otherwise the data integrity would be jeopardized. Such a data write whose integrity is dependent on the occurrence of a previous data write is known as a dependent write. Volumes in the primary and secondary storages are consistent when all writes have been transferred in their logical order, i.e., all dependent writes transferred first before the writes dependent thereon. A consistency group has a consistency time for all data writes in a consistency group having a time stamp equal or earlier than the consistency time stamp. A consistency group is a collection of updates to the primary volumes such that dependent writes are secured in a consistent manner. The consistency time is the latest time to which the system guarantees that updates to the secondary volumes are consistent. Consistency groups maintain data consistency across volumes and storage devices. Thus, when data is recovered from the secondary volumes, the recovered data will be consistent.

One technique to provide a consistent point-in-time copy of data is to suspend all writes to the primary storage and then while writes are suspended copy all the data to mirror to the secondary storage or backup device. A disadvantage of this technique is that host writes are suspended for the time to create a point-in-time copy of data, which may adversely effect application processing at the host. An alternative technique is to establish a logical copy of data at the primary storage target, which takes a very short period of time, such as no more than a second or two. Thus, suspending host writes to the primary storage during the time to establish the logical copy is far less disruptive to host application processing than would occur if host writes were suspended for the time to copy all the source data to the target volume. After establishing the logical copy, source volume data subject to an update is copied to a target volume so that the target volume has the data as of the point-in-time the logical copy was established, before the update. This defers the physical copying until an update is received. This logical copy operation is performed to minimize the time during which the target and source volumes are inaccessible. The point-in-time copy comprises the combination of the data in the source volume and the updates One such logical copy operation is known as FlashCopy® (FlashCopy is a registered trademark of International Business Machines, Corp. or "IBM"). FlashCopy® involves establishing a logical point-in-time copy relationship between primary and secondary volumes on different devices. Once the logical relationship is established, hosts may then have immediate access to data on the primary and secondary volumes, and the data may be copied as part of a background operation. The data is copied from the primary to the secondary volumes as part of a background operation. While the data is being copied over, reads to any tracks in the primary cache that have not been updated with the data from the primary storage causes the source track to be staged to the secondary cache before access is provided to the track from the secondary cache. Any reads of data on secondary tracks that have not been copied over cause the data to be copied over from the primary device to the secondary cache so that the secondary target has the copy from the source that existed at the point-in-time of the FlashCopy® operation. Further, any writes to tracks on the primary storage that have not been copied over cause the tracks on the primary storage to be copied to the secondary storage.

To perform the logical copy operation, an entire target volume may be allocated at the secondary storage to store updates to the primary volume, which requires that the same amount of storage space be allocated on the secondary storage for the target volume as is allocated in the primary storage for the source volume. To save space on the secondary storage space, certain space efficient logical copy techniques known in the art allocate a repository to store the updates to the source volume during the logical copy period, where the repository space is substantially less than the full volume size of the source volume because in many cases the data updated on the source volume during the logical copy duration that must be copied to the target is substantially less than the storage space of the full source volume.

SUMMARY

Provided are a method, system, and article of manufacture for maintaining information of a relationship of target volumes comprising logical copies of a source volume. Information is maintained on a source volume having a plurality of data units and a plurality of target volumes created at different points-in-time maintaining a logical copy of the data units in the source volume for the different points-in-time. A source downstream pointer is generated for each data unit in the source volume to point to a corresponding data unit in a first target volume. For each target volume data unit whose data is maintained in the source volume or another one of the target volumes, a first upstream pointer is generated indicating one of the source and target volumes from which the target volume data unit inherits data. For each target volume data unit whose data is maintained in the source volume or another one of the target volumes, generating a second upstream pointer indicating one of the source and target volumes having the data for the data unit.

In a further embodiment, the data for at least one of the target volume data units is not included in the target volume addressed by the first upstream pointer but is included in the source or target volume addressed by the second upstream pointer.

In a further embodiment, the source downstream pointer for each data unit points to the target volume of a most recently created target volume, and wherein the first upstream pointer of each target volume data unit whose data is maintained in one of the source and other target volumes points to one target volume having a later point-in-time than the target volume for which the source downstream pointer is maintained.

In a further embodiment, for each target volume data unit, a downstream pointer is generated pointing to the corresponding target volume data unit of one target volume inheriting from the target volume data unit.

In a further embodiment, a new target volume is created as a logical copy of the source volume. The downstream pointers of each source volume data unit are updated to point to the new target volume. The first and second upstream pointers of each of the new target volume data units are updated to point to the source volume.

In a further embodiment, the first upstream pointer of the target volume data unit that addressed the source volume prior to creation of the new target volume is updated to point to the new target volume. The second upstream pointer of the target volume data unit whose first upstream pointer addressed the source volume prior to creation of the new target volume continues to address the corresponding source volume data unit.

In a further embodiment, a write is applied to one target volume data unit. The first upstream pointer of the target volume data unit addressing the target volume subject to the write is updated to indicate the source volume or target volume addressed by the first upstream pointer of the target volume data unit subject to the write.

In a further embodiment, the first and second upstream pointers of the target volume data unit subject to the write are updated to remove indication of any source or target volume.

In a further embodiment, the write comprises a first write. A second write is received to the target volume data unit whose first and second upstream pointers do not indicate one of the source and target volumes. Data in the target volume data unit subject to the second write is copied to the corresponding target volume data unit whose first upstream pointer addresses the target volume subject to the write. The received second write is applied to the target volume data unit in response to the copying of the data to the target volume data unit. The first and second upstream pointers of the target volume data unit to which the data is copied are updated to remove indication of any volume.

In a further embodiment, the second upstream pointer of each target volume data unit whose second upstream pointer addresses the target volume subject to the second write is updated to indicate the target volume to which the data was copied.

In a further embodiment, a write to one source volume data unit is received. Data in the source volume data unit subject to the write is copied to the corresponding data unit in the target volume indicated in the source downstream pointer for the source volume data unit subject to the write. The received write is applied to the source volume data unit in response to copying the data to the corresponding target volume data unit. The first and second upstream pointers of the target volume data unit to which the data is copied are updated to remove indication of any of the source and target volumes.

In a further embodiment, the second upstream pointer of each target volume data unit whose second upstream pointer addresses the source volume data unit subject to the write is updated to indicate the target volume to which the data from the source volume data unit was copied.

In a further embodiment, wherein target volumes comprise space efficient target volumes.

In a further embodiment, a read request directed to a target volume data unit is received. A determination is made as to whether the second upstream pointer of the of the target volume data unit subject to the read request addresses the source or another target volume. Data is read from the target volume data unit in response to determining that the second upstream pointer does not address the source or another target volume. Data is read at the corresponding data unit in the source or target volume indicated in the second upstream pointer of the target volume data unit subject to the read request in response to determining that the second upstream pointer addresses the source or another target volume. The read data is returned to the read request.

DETAILED DESCRIPTION

Figure 1:
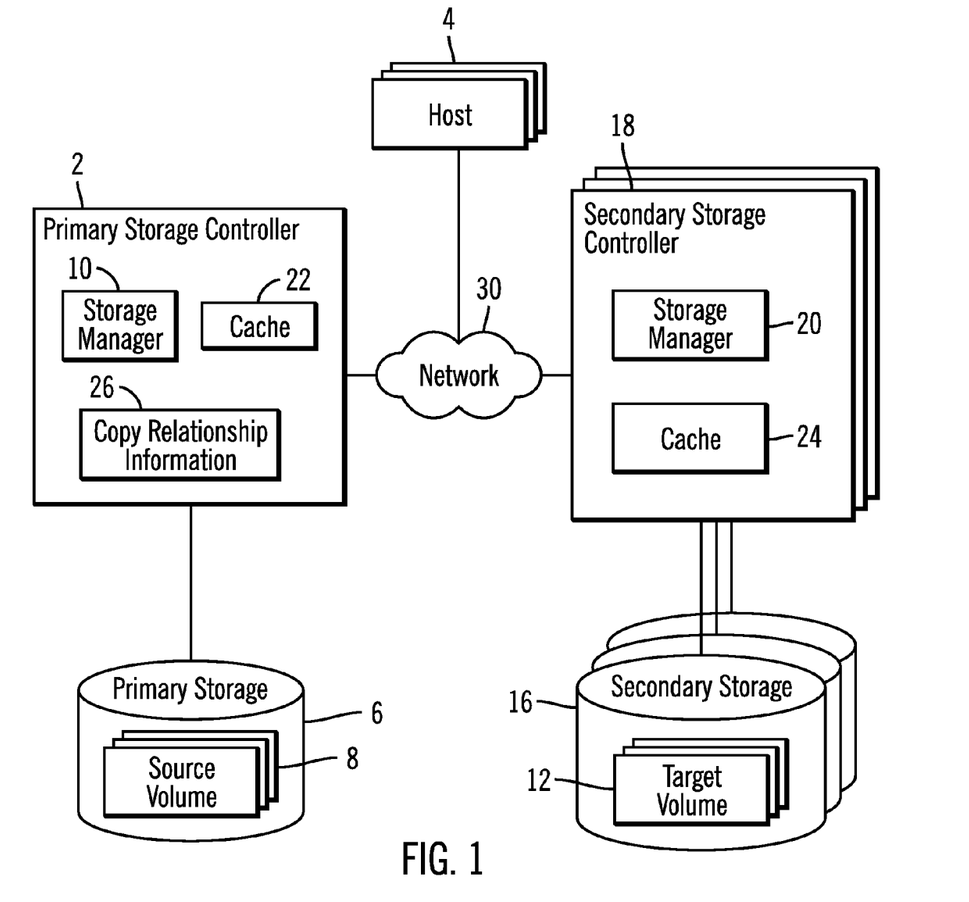
FIG. 1 illustrates an embodiment of a computing environment.

FIG. 1 illustrates an embodiment of a network computing environment. A primary storage controller 2 manages Input/Output (I/O) requests from one or more host systems 4 to a primary storage 6 in which storage volumes 8, referred to as source volumes 8, are configured. The primary storage controller 2 includes a storage manager 10 program that manages I/O requests to the primary storage volumes 8 and may maintain copy relationships for source volumes 8, such that updates to source volumes 8 in a copy relationship are copied to target volumes 12 or repositories 14 in a secondary storage 16. A secondary storage controller 18 includes a storage manager 20 program to manage I/O access to the secondary storage 16.

The primary 2 and secondary 18 storage controllers include a cache 22 and 24, respectively, to buffer read and write data to their corresponding storage 6 and 16. Both the primary 2 and secondary 18 storage controllers may receive read and write requests from host systems 4.

The primary storage manager 10 may maintain copy relationship information 26 having information on source volumes 6 and target volumes 12 in a logical copy relationship. There may be multiple logical copies of a source volume 6 to multiple target volumes 6, where multiple target volumes provide logical copies of one source volume at different points-in-time. The copy relationship information 26 including information on logical copy relationships may be maintained by both the primary 2 and secondary 18 storage controllers, or a single copy 26 may be shared between the primary 2 and secondary 18 storage controllers.

The primary 2 and secondary 18 storage controllers and host 4 may communicate over a network 30. The network 30 may comprise a Storage Area Network (SAN), Local Area Network (LAN), Intranet, the Internet, Wide Area Network (WAN), peer-to-peer network, wireless network, arbitrated loop network, etc. The storages 6 and 16 may each comprise an array of storage devices, such as a Just a Bunch of Disks (JBOD), Direct Access Storage Device (DASD), Redundant Array of Independent Disks (RAID) array, virtualization device, tape storage, flash memory, etc.

In certain embodiments, volumes 8 and 12 in the storage systems 6 and 16 maintained by a storage controller 2 and 18, respectively, may be assigned to one or more sessions. Volumes may be organized in a logical subsystem (LSS), and the volumes in a LSS maintained by a primary storage controller 2 may be assigned to a session.

Figure 2:
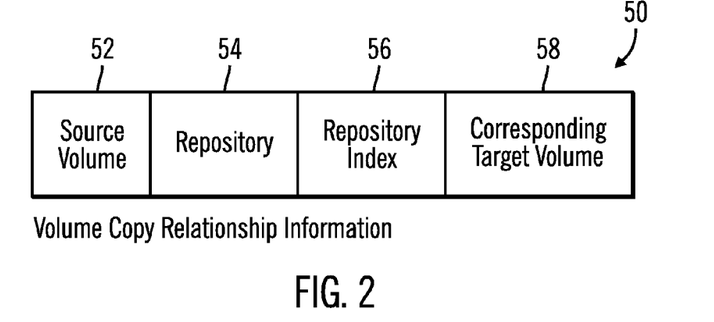
FIG. 2 illustrates an embodiment of volume copy relationship information.

FIG. 2 illustrates an embodiment of volume copy relationship information 50 maintained for one source volume 6 in a logical copy relationship, such as a FlashCopy® relationship. The copy relationship information 26 includes volume copy relationship information 50 for each source volume 8 in a logical copy relationship with a corresponding target volume 12. In a logical copy relationship, the copy relationship is established by creating copy relationship information, such as information 50 and a volume bitmap including a bit for each track in the source volume 8, where each bit indicates whether a track has been updated and the point-in-time data copied to the secondary storage 16, which comprises the source volume data before being updated, as of the point-in-time the logical copy relationship was established. Any source volume 8 point-in-time data subject to an update is copied to a corresponding target volume 12 if a full target volume 12 is allocated as the backup space to store point-in-time data subject to an update or the target volume is maintained as a target repository 14 if less than a full volume is allocated as the backup space for the source volume 8. The term "target volume" refers to the data structure providing a logical copy of a source volume, which may be implemented as a fully allocated target volume 58 or a repository 54.

The volume copy relationship information 50 indicates the source volume 52 subject to the copy relationship. If space efficient logical copy is used, which means less than a full volume is allocated on the secondary storage 16 to store the point-in-time data subject to an update in the source volume 8, then a repository field 54 identifies a repository 14 in the secondary storage 12 and a repository index 56 indicates the location where the copied point-in-time data from the source volume 52, e.g., a track or other data unit, is stored in the identified repository 54. If a full target volume is used to store the point-in-time data that is updated, then the repository fields 54 and 56 are null and a corresponding target volume field 58 indicates a target volume 12 allocated as the backup space to store data subject to an update in the source volume 8 during the logical copy duration. With the described embodiments, source volumes 6 in logical copy relationships may use either a repository or full volume as the backup space, where different source volumes may have different types of backup space, e.g., repository or full volume.

If there are multiple target volumes providing the same or different point-in-time copies of one source volume, then there may be an instance of the volume copy relationship information 50 for each source-target volume pair.

Figure 3:
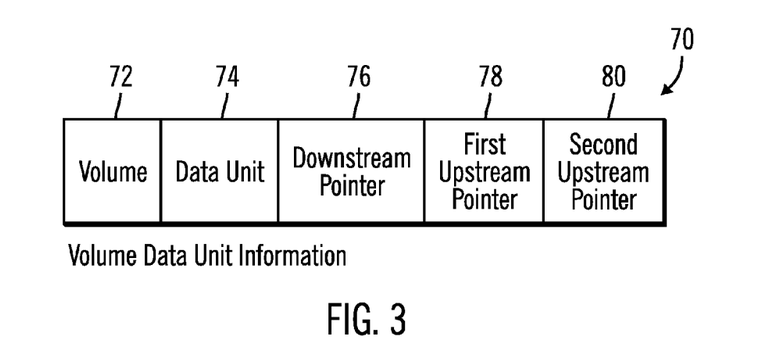
FIG. 3 illustrates an embodiment of volume data unit information.

FIG. 3 illustrates an embodiment of volume data unit information 70, where an instance of the information 70 is maintained for each data unit in a source volume 52 and for each data unit in a target volume in a logical copy relationship. Each volume data unit information instance 70 includes a volume field 72 identifying the source or target volume for which the information is maintained, a data unit 74 in the volume 72, a downstream pointer 76 indicating a downstream target volume whose corresponding data unit which inherits data from the data unit 74 of the volume 72, a first upstream pointer 78 indicating an upstream source or target volume from which the identified volume 72 and data unit 74 inherits data, and a second upstream pointer 80 indicating the source or target volume that has a copy of the data for the identified volume 72 and data unit 74. The upstream source target volume identified by the first upstream pointer 78 may or may not be the same as the source or target volume that has the actual data for the data unit.

A data unit may comprise any grouping of logical or physical units of data in a volume, such as one or more tracks, a stride, logical block addressers (LBAs), chunks, etc. If a full target volume is allocated for the source volume, than the target volume maintains a corresponding data unit for every data unit in the source volume. For a space efficient logical copy, the target volume repository 54 only includes a corresponding data unit for modified data in the source volume that was copied to the target volume before being overwritten by the update to the source volume.

Figure 4:
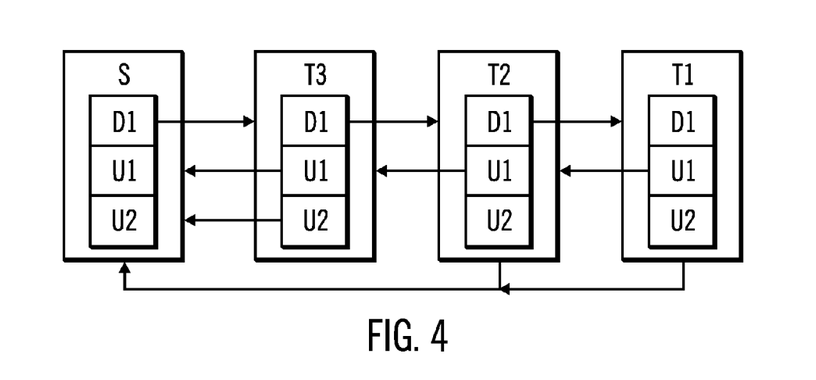
FIG. 4 illustrates an example of how target volume units may inherit data from a source volume and other target volumes.

FIG. 4 illustrates an example of the pointers 76, 78, and 80 for a same data unit in the source volume (S) and target volumes (T1, T2, T3) comprising logical copies of the source volume (S). In this example, the source volume (S) has the value for the data unit, which value is inherited by the target volumes (T1, T2, T3), which means the value for the data unit in the source (S) and target (T1, T2, T3) volumes has not been updated since the point-in-time copy of the target volumes (T1, T2, T3) was made. The first upstream pointer 78 for the data unit in each of these target volumes (T1, T2, T3) points to the source volume (S) or the more recently created target volumes T2 and T3, respectively, that either have the data (e.g., S) or inherit the data from the volume that includes the data. Thus, the first upstream pointer 78 for each target volume points to either the source volume or the target volume which has a point-in-time closest to the point-in-time of the target volume, where the addressed upstream target volume either has the data or inherits the data from a further upstream source or target volume. The second upstream pointer 80 for each target volume (T1, T2, T3) addresses the actual source (S) (or target) volume that includes the actual data value. The first upstream pointers 78 for the data unit of the target volumes (T1, T2, T3) that inherit the data from the source volume (S) addressed by the second upstream pointer 80 forms a linked list of target volumes. The downstream pointer 76 of each target volume whose data unit inherits data from the source or target volume addressed by the second upstream pointer 80 points to a target volume having a later point-in-time whose first upstream pointer 78 addresses the source or target volume. The source volume has null upstream pointers 78 and 80 and only a downstream pointer 76 pointing to the most recent target volume whose data unit inherits data from the corresponding data unit in the source volume. Further, the target also has a null downstream pointer 76, where FIG. 4 provides one example of the upstream and downstream pointers for consecutively created target volumes. Other variations of the pointers may result from the operations performed in FIGS. 5, 6, 7, and 8.

Figure 5:
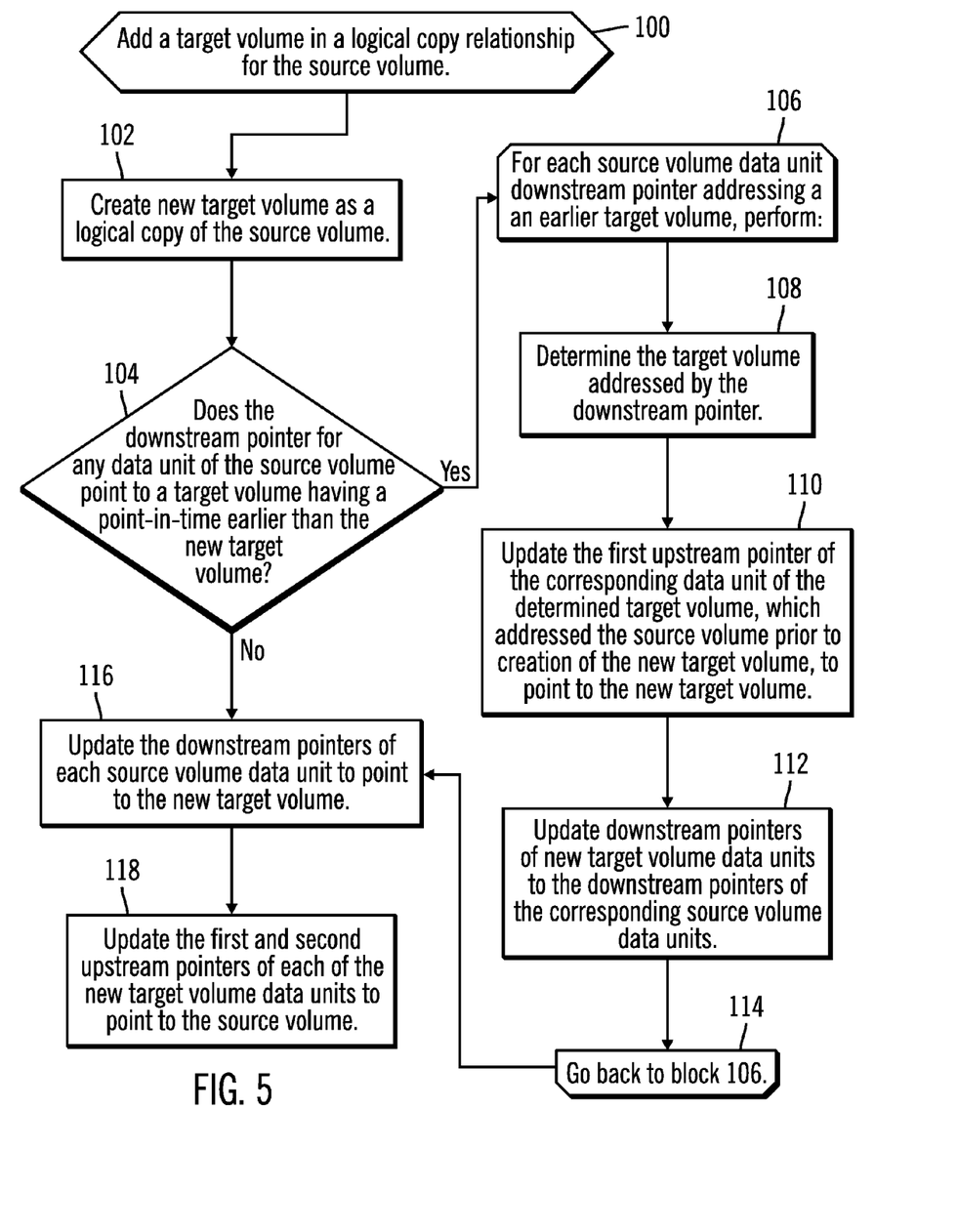
FIG. 5 illustrates an embodiment of operations to add a target volume in a logical copy relationship to a source volume.

FIG. 5 illustrates an embodiment of operations performed by the storage manager 10 in the primary storage controller 2 to create a target volume 12 for the source volume 8 in a logical copy relationship, where multiple target volumes may be in logical copy relationships at different points-in-time with the same source volume. Upon initiating an operation to add (at block 100) a target volume 12 in a logical copy relationship with a source volume 8 as of a point-in-time, the storage manager 10 creates the new target volume 12 as a logical copy of the source volume 8, and may generate volume copy relationship information 50 providing information on the logical copy. The created target volume may comprise a fully allocated target volume 50, having a data unit allocated for every data unit in the source volume 52, or may comprise a repository 54 in a space efficient copy. If (at block 104) the downstream pointer 76 for any data unit of the source volume 52 points to a pre-existing target volume having a point-in-time earlier than the new target, i.e., a non-null value, then the operations at blocks 106 through 114 are performed for each source volume data unit downstream pointer 76 addressing a target volume. The storage manager 10 determines (at block 108) the target volume addressed by the source volume data unit downstream pointer 76. The storage manager 10 further updates (at block 110) the first upstream pointer 78 of the corresponding data unit of the determined target volume, which addressed the source volume prior to creation of the new target volume, to point to the new target volume. The downstream pointers 76 of the new target volume data units are updated (at block 112) to the downstream pointers of the corresponding source volume data units so that the data units in the target volume addressed by the source volume data units before creating the new target volume inherit their data from the new target volume, i.e., are identified by both the downstream pointers 76 of the new target volume and the first upstream pointers 78 of the preexisting target volume as downstream from the new target volume.

If (at block 104) there is no pre-existing target volume, i.e., the downstream pointers 76 of the source volume data units are null or after updating (at block 114) the downstream pointers of the new target volume to point to the target volume previously downstream from the source volume, the storage manager 10 updates (at block 116) the downstream pointers 76 of each source volume data unit to point to the new target volume and updates (at block 118) the first 78 and second 80 upstream pointers of each of the new target volume data units to point to the source volume, to indicate that the new target volume data units are immediately downstream from the source volume.

Figure 6:
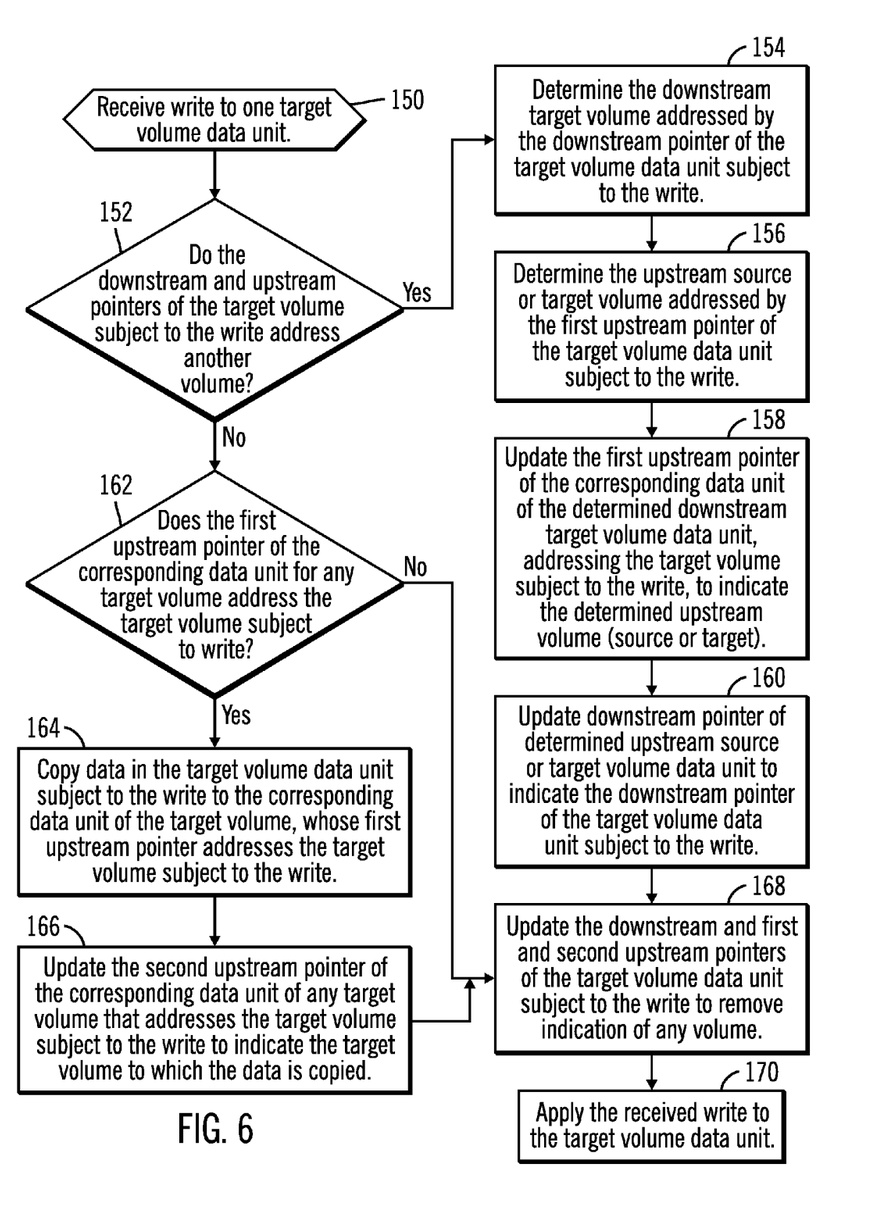
FIG. 6 illustrates an embodiment of operations to process a write to one target volume data unit.

FIG. 6 illustrates an embodiment of operations performed by the storage manager 10 at the primary storage controller 2 or storage manager 20 in the secondary storage controller 18 managing the target volume 12 to process a write to a target volume 12. Upon receiving (at block 150) a write to one target volume 12 data unit, the storage manager 10, 20 determines (at block 152) whether the downstream 76 and upstream 78 pointers of the target volume subject to the write address another volume, i.e., whether both the target volume subject to the write inherits data from an upstream source or target volume and a downstream target volume inherits data from the target volume data unit subject to the write. If (at block 152) the target volume subject to the write has both downstream 76 and upstream 78, 80 pointers addressing other volumes, then the storage manager 10, 20 determines (at block 154) the downstream target volume addressed by the downstream pointer 76 of the target volume data unit subject to the write and determines (at block 156) the upstream source or target volume addressed by the first upstream pointer 78 of the target volume data unit subject to the write. The storage manager 10, 20 updates (at block 158) the first upstream pointer 78 of the corresponding data unit of the determined downstream target volume data unit, addressing the target volume subject to the write, to indicate the determined upstream volume (source or target). The downstream pointer 76 of the determined upstream source or target volume data unit is updated (at block 160) to indicate the downstream pointer 76 of the target volume data unit subject to the write. The operations at blocks 158 and 160 adjust the pointers of the target volume that is downstream to the target volume to update to point to the target or source volume upstream from the target volume subject to the update so that the linked target and source volume data units skip the target volume data unit subject to the update.

If (at block 152) the target volume data unit to update does not both inherit from a volume (source or target) and is inherited by a downstream target volume and if (at block 162) a target volume inherits data, i.e., is downstream, from the target volume data unit to update, i.e., another target volume data unit first upstream pointer 76 addresses the target volume unit to update (or the target volume data unit to update downstream pointer 76 addresses another target volume), then the data in the target volume data unit subject to the write is copied (at block 164) to the corresponding data unit of the downstream target volume (which has a upstream pointer 76 that addresses the target volume subject to the write and which is addressed by the downstream pointer 76 of the target volume to update). Further, the second upstream pointer 80 of the corresponding data unit of any target volume that addresses the target volume subject to the write is updated (at block 166) to indicate the target volume to which the data is copied.

After any adjustment of pointers 76, 68, and 80 at blocks 160 or 166, or if there is no adjustment (from the no branch of block 162 in the case that the target volume data unit to update does not inherit or is not inherited, i.e., is not upstream or downstream to other volumes), control proceeds to block 168 to update the downstream 76 and first 78 and second 80 upstream pointers of the target volume data unit subject to the write to remove indication of any volume, e.g., set to null, to indicate that the actual data is maintained at the target volume data unit. After the pointers are set to null or set to not indicate any volumes, the received write data is applied (at block 170) to the target volume. Once a target volume data unit is updated, it no longer includes point-in-time data that is inherited from an upstream source or target volume or that is inherited by a downstream target volume because the target volume was updated directly. A target volume may be updated independently of a source volume if the target volume is used as a test volume.

Figure 7:
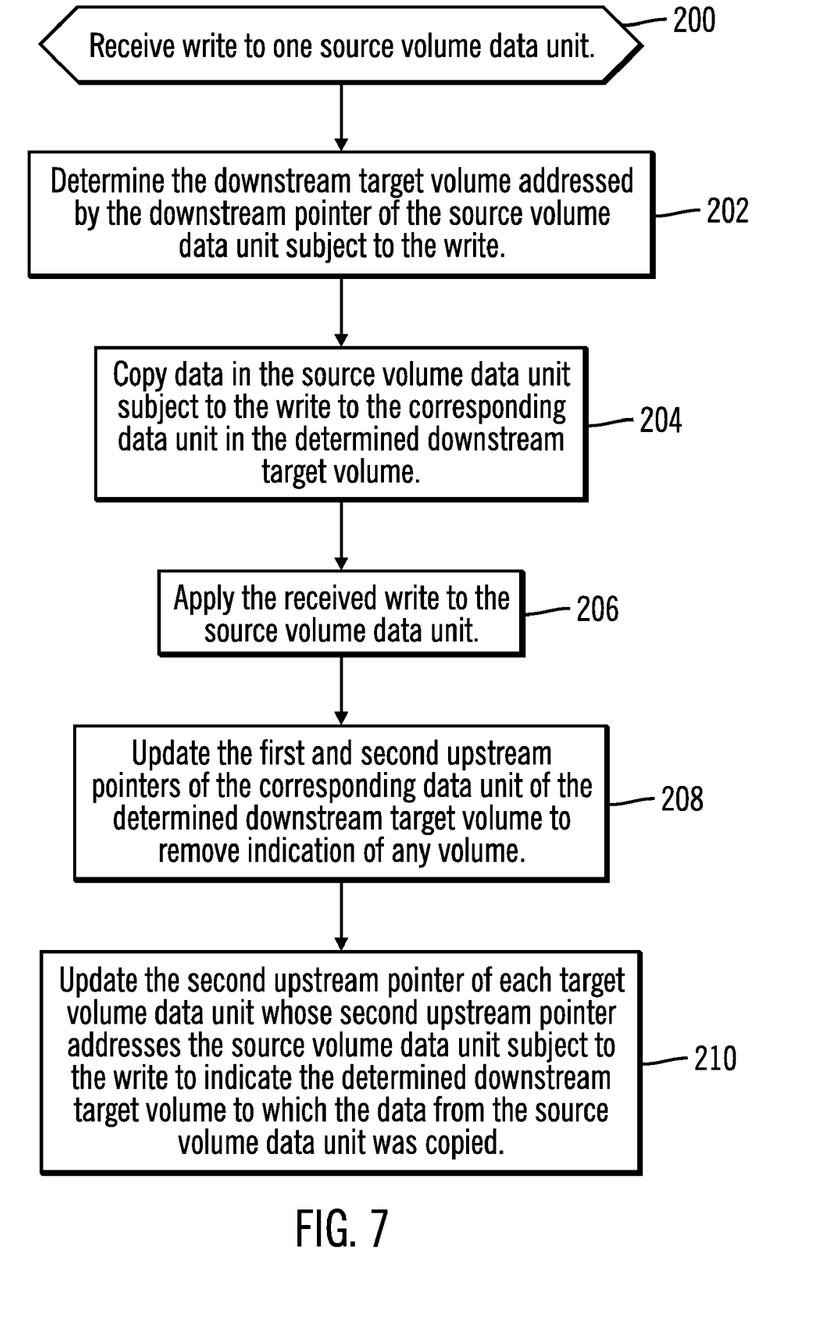
FIG. 7 illustrates an embodiment of operations to process a write to one source volume data unit.

FIG. 7 illustrates an embodiment of operations performed by the storage manager 10 to update the pointers 76, 78, 80 in the event an update is received at a source volume data unit, which may overwrite point-in-time data inherited by the corresponding target volume data units. Upon receiving (at block 200) the write to the source volume data unit, the storage manager 10 determines (at block 202) the downstream target volume addressed by the downstream pointer 76 of the source volume data unit subject to the write. The data in the source volume data unit subject to the write is copied (at block 204) to the corresponding data unit in the determined downstream target volume to preserve the point-in-time copy of the data. The write is then applied (at block 206) to the source volume data unit. The first 78 and second 80 upstream pointers of the corresponding data unit of the determined downstream target volume are updated (at block 208) to remove indication of any volume because the point-in-time data is now in the target volume data unit. Further, the storage manager 10 updates (at block 210) the second upstream pointer 80 of each target volume data unit whose second upstream pointer 80 addresses the source volume data unit subject to the write to indicate the downstream target volume to which the data from the source volume data unit was copied because after the copying, the point-in-time data is in the downstream target volume.

Figure 8:
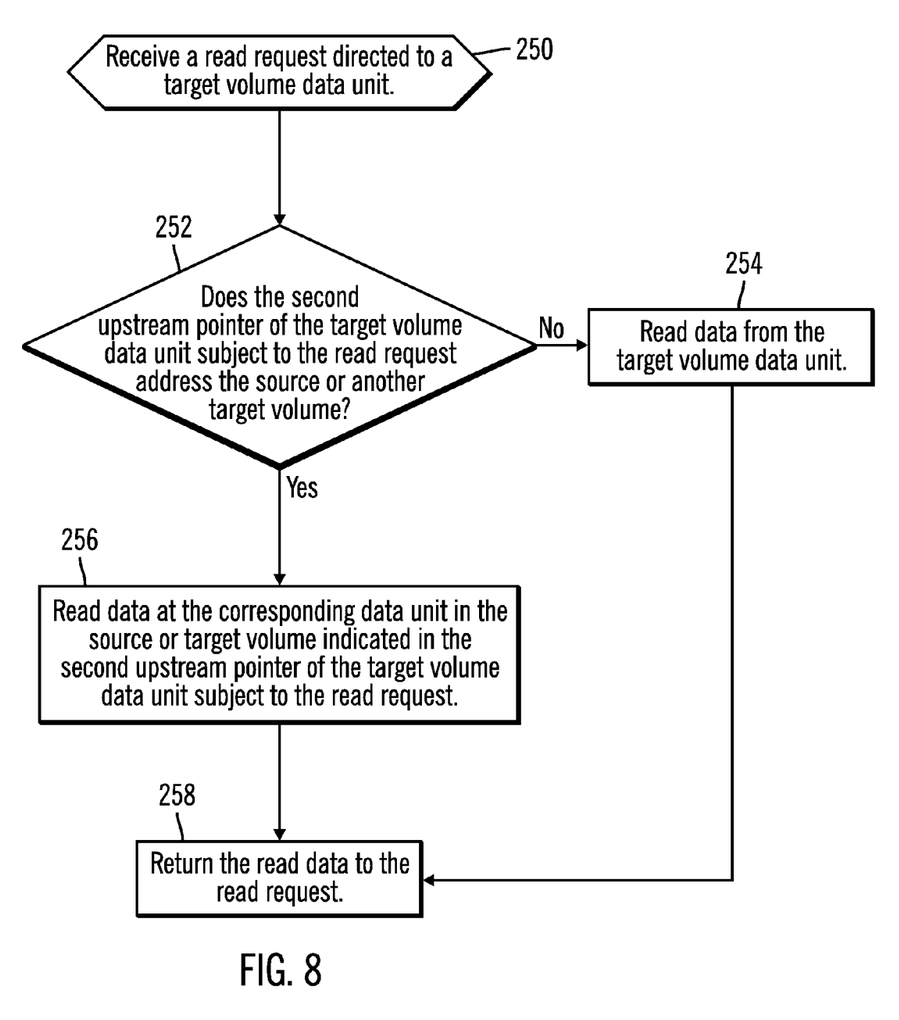
FIG. 8 illustrates an embodiment of operations to process a read request to one target volume data unit.

FIG. 8 illustrates an embodiment of operations performed by the storage manager 10, 20 to process a read request to a target volume data unit, where the data may be maintained at the target volume data unit, i.e., a target volume 58 or repository 56, at another target volume 12 or in the source volume 8. Upon receiving the read request (at block 250), the storage manager 10, 20 determines (at block 252) whether the second upstream pointer 80 of the target volume data unit subject to the read request addresses the source or another target volume, i.e., the point-in-time data is inherited from an upstream source or target volume. If (at block 252) the second upstream pointer 80 does not address another volume, i.e., the actual data is maintained in the target volume (e.g., an allocated target volume data unit or repository 54), then the data is read (at block 254) from the target volume data unit. If (at block 252) the second upstream pointer 80 addresses another volume, i.e., the actual data is inherited from the source or target volume, then the data is read (at block 256) at the corresponding data unit in the source or target volume indicated in the second upstream pointer 80 of the target volume data unit subject to the read request and the read data is returned (at block 258) to the read request.

Described embodiments provide techniques to allow multiple target volumes created from a single source volume to inherit data from the source volume or another target volume so the actual data does not have to be written to each target volume data unit that is a logical copy of the same source volume.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable storage medium", where a processor may read and execute the code from the computer storage readable medium. A computer readable storage medium may comprise storage media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The "article of manufacture" may comprise a transmitting station and/or a receiving station for transmitting and receiving transmission signals in which the code or logic is encoded, where the code or logic encoded in the transmission signal may be decoded and stored in hardware or a computer readable storage medium at the receiving and transmitting stations or devices. An "article of manufacture" comprises a computer readable storage medium, hardware device, and/or transmission transmitters or receivers in which code or logic may be implemented. Those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 5, 6, 7, and 8 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   maintaining information on a source volume having a plurality of data units and a plurality of target volumes created at different points-in-time;
   maintaining a logical copy of the data units in the source volume for the different points-in-time;
   generating a different source downstream pointer for each data unit in the source volume to point to a corresponding data unit in a first target volume, wherein there are a plurality of the source downstream pointers for the data units in the source volume;
   generating, for each target volume data unit whose data is maintained in the source volume or another one of the target volumes, a different first upstream pointer indicating one of the source and target volumes from which the target volume data unit inherits data, wherein there are a plurality of the first downstream pointers for the data units in the target volume;
   generating, for each target volume data unit whose data is maintained in the source volume or another one of the target volumes, a different second upstream pointer indicating one of the source and target volumes having the data for the data unit, wherein there are a plurality of the second upstream pointers for the data units in the target volume;
   creating a new target volume as a logical copy of the source volume; and
   updating the first upstream pointers of the first target volume data units to point to the new target volume, wherein the second upstream pointers of the first target volume data units point to the source volume data units while the first upstream pointers of the first target volume data units point to the new target volume.

2. The method of claim 1, wherein the data for at least one of the target volume data units is not included in the target volume addressed by the first upstream pointer but is included in the source or target volume addressed by the second upstream pointer.

3. The method of claim 1, wherein the source downstream pointer for each data unit points to the target volume of a most recently created target volume, and wherein the first upstream pointer of each target volume data unit whose data is maintained in one of the source and other target volumes points to one target volume having a later point-in-time than the target volume for which the source downstream pointer is maintained.

4. The method of claim 1, further comprising:
   generating, for each target volume data unit, a downstream pointer pointing to the corresponding target volume data unit of one target volume inheriting from the target volume data unit.

5. The method of claim 1, further comprising:
   updating the downstream pointers of each source volume data unit to point to the new target volume; and
   updating the first and second upstream pointers of each of the new target volume data units to point to the source volume.

6. The method of claim 1, further comprising:
   applying a write to one target volume data unit; and
   updating the first upstream pointer of the target volume data unit addressing the target volume subject to the write to indicate the source volume or target volume addressed by the first upstream pointer of the target volume data unit subject to the write.

7. The method of claim 6, further comprising:
   updating the first and second upstream pointers of the target volume data unit subject to the write to remove indication of any source or target volume.

8. The method of claim 7, wherein the write comprises a first write, further comprising:
   receiving a second write to the target volume data unit whose first and second upstream pointers do not indicate one of the source and target volumes;
   copying data in the target volume data unit subject to the second write to a corresponding target volume data unit whose first upstream pointer addresses the target volume subject to the write;
   applying the received second write to the target volume data unit in response to the copying of the data to the corresponding target volume data unit; and
   updating the first and second upstream pointers of the target volume data unit to which the data is copied to remove indication of any volume.

9. The method of claim 8, further comprising:
   updating the second upstream pointer of each target volume data unit whose second upstream pointer addresses the target volume subject to the second write to indicate the target volume to which the data was copied.

10. The method of claim 1, further comprising:
    receiving a write to one source volume data unit;
    copying data in the source volume data unit subject to the write to the corresponding data unit in the target volume indicated in the source downstream pointer for the source volume data unit subject to the write;
    applying the received write to the source volume data unit in response to copying the data to the corresponding target volume data unit; and
    updating the first and second upstream pointers of the target volume data unit to which the data is copied to remove indication of any of the source and target volumes.

11. The method of claim 10, further comprising:
    updating the second upstream pointer of each target volume data unit whose second upstream pointer addresses the source volume data unit subject to the write to indicate the target volume to which the data from the source volume data unit was copied.

12. The method of claim 1, wherein target volumes comprise space efficient target volumes.

13. The method of claim 1, further comprising:
    receiving a read request directed to a target volume data unit;
    determining whether the second upstream pointer of the target volume data unit subject to the read request addresses the source or another target volume;
    reading data from the target volume data unit in response to determining that the second upstream pointer does not address the source or another target volume;
    reading data at the corresponding data unit in the source or target volume indicated in the second upstream pointer of the target volume data unit subject to the read request in response to determining that the second upstream pointer addresses the source or another target volume; and
    returning the read data to the read request.

14. A system in communication with volumes in at least one storage system, comprising:
    a computer readable storage medium; and
    a storage manager in communication with the computer readable storage medium that performs operations, the operations comprising:
        maintaining information in the computer readable storage medium on a source volume having a plurality of data units and a plurality of target volumes created at different points-in-time;
    maintaining a logical copy of the data units in the source volume for the different points-in-time;
        generating in the computer readable storage medium a different source downstream pointer for each data unit in the source volume to point to a corresponding data unit in a first target volume, wherein there are a plurality of the source downstream pointers for the data units in the source volume;
        generating in the computer readable storage medium, for each target volume data unit whose data is maintained in the source volume or another one of the target volumes, a different first upstream pointer indicating one of the source and target volumes from which the target volume data unit inherits data, wherein there are a plurality of the first downstream pointers for the data units in the target volume;
        generating in the computer readable storage medium, for each target volume data unit whose data is maintained in the source volume or another one of the target volumes a different second upstream pointer indicating one of the source and target volumes having the data for the data unit, wherein there are a plurality of the second upstream pointers for the data units in the target volume;
        creating a new target volume as a logical copy of the source volume; and
        updating the first upstream pointer of each of the first target volume data units to point to the new target volume, wherein the second upstream pointers of the first target volume data units point to the source volume data units while the first upstream pointers of the first target volume data units point to the new target volume.

15. The system of claim 14, wherein the source downstream pointer for each data unit points to the target volume of a most recently created target volume, and wherein the first upstream pointer of each target volume data unit whose data is maintained in one of the source and other target volumes points to one target volume having a later point-in-time than the target volume for which the source downstream pointer is maintained.

16. The system of claim 14, wherein the operations further comprise:
    generating, for each target volume data unit, a downstream pointer pointing to the corresponding target volume data unit of one target volume inheriting from the target volume data unit.

17. The system of claim 14, further comprising:
    updating the downstream pointers of each source volume data unit to point to the new target volume; and
    updating the first and second upstream pointers of each of the new target volume data units to point to the source volume.

18. The system of claim 14, wherein the operations further comprise:
    applying a write to one target volume data unit; and
    updating the first upstream pointer of the target volume data unit addressing the target volume subject to the write to indicate the source volume or target volume addressed by the first upstream pointer of the target volume data unit subject to the write.

19. The system of claim 14, wherein the operations further comprise:
    receiving a write to one source volume data unit;
    copying data in the source volume data unit subject to the write to the corresponding data unit in the target volume indicated in the source downstream pointer for the source volume data unit subject to the write;
    applying the received write to the source volume data unit in response to copying the data to the corresponding target volume data unit; and
    updating the first and second upstream pointers of the target volume data unit to which the data is copied to remove indication of any of the source and target volumes.

20. The system of claim 14, wherein the operations further comprise:
    receiving a read request directed to a target volume data unit;
    determining whether the second upstream pointer of the target volume data unit subject to the read request addresses the source or another target volume;
    reading data from the target volume data unit in response to determining that the second upstream pointer does not address the source or another target volume;
    reading data at the corresponding data unit in the source or target volume indicated in the second upstream pointer of the target volume data unit subject to the read request in response to determining that the second upstream pointer addresses the source or another target volume; and
    returning the read data to the read request.

21. An article of manufacture including a storage manager in communication with volumes in at least one storage system and a computer readable storage medium, wherein the storage manager is executed to perform operations the operations comprising:
    maintaining information in the computer readable storage medium on a source volume having a plurality of data units and a plurality of target volumes created at different points-in-time;
    maintaining a logical copy of the data units in the source volume for the different points-in-time;
    generating in the computer readable storage medium a different source downstream pointer for each data unit in the source volume to point to a corresponding data unit in a first target volume, wherein there are a plurality of the source downstream pointers for the data units in the source volume;

generating in the computer readable storage medium, for each target volume data unit whose data is maintained in the source volume or another one of the target volumes, a different first upstream pointer indicating one of the source and target volumes from which the target volume data unit inherits data, wherein there are a plurality of the first downstream pointers for the data units in the target volume;

generating in the computer readable storage medium, for each target volume data unit whose data is maintained in the source volume or another one of the target volumes a different second upstream pointer indicating one of the source and target volumes having the data for the data unit, wherein there are a plurality of the second upstream pointers for the data units in the target volume;

creating a new target volume as a logical copy of the source volume; and updating the first upstream pointer of each of the first target volume data units to point to the new target volume, wherein the second upstream pointers of the first target volume data units point to the source volume data units while the first upstream pointers of the first target volume data units point to the new target volume.

22. The article of manufacture of claim 21, wherein the source downstream pointer for each data unit points to the target volume of a most recently created target volume, and wherein the first upstream pointer of each target volume data unit whose data is maintained in one of the source and other target volumes points to one target volume having a later point-in-time than the target volume for which the source downstream pointer is maintained.

23. The article of manufacture of claim 21, wherein the operations further comprise:
generating, for each target volume data unit, a downstream pointer pointing to the corresponding target volume data unit of one target volume inheriting from the target volume data unit.

24. The article of manufacture of claim 21, further comprising:
updating the downstream pointers of each source volume data unit to point to the new target volume;
updating the first and second upstream pointers of each of the new target volume data units to point to the source volume.

25. The article of manufacture of claim 21, wherein the operations further comprise:
applying a write to one target volume data unit; and
updating the first upstream pointer of the target volume data unit addressing the target volume subject to the write to indicate the source volume or target volume addressed by the first upstream pointer of the target volume data unit subject to the write.

26. The article of manufacture of claim 21, wherein the operations further comprise:
receiving a write to one source volume data unit;
copying data in the source volume data unit subject to the write to the corresponding data unit in the target volume indicated in the source downstream pointer for the source volume data unit subject to the write;
applying the received write to the source volume data unit in response to copying the data to the corresponding target volume data unit; and
updating the first and second upstream pointers of the target volume data unit to which the data is copied to remove indication of any of the source and target volumes.

27. The article of manufacture of claim 21, wherein the operations further comprise:
receiving a read request directed to a target volume data unit;
determining whether the second upstream pointer of the target volume data unit subject to the read request addresses the source or another target volume;
reading data from the target volume data unit in response to determining that the second upstream pointer does not address the source or another target volume;
reading data at the corresponding data unit in the source or target volume indicated in the second upstream pointer of the target volume data unit subject to the read request in response to determining that the second upstream pointer addresses the source or another target volume; and
returning the read data to the read request.

* * * * *